United States Patent
Lee

(10) Patent No.: US 7,218,620 B2
(45) Date of Patent: May 15, 2007

(54) SYSTEM OF SIMULATING MOBILE COMMUNICATION AND METHOD THEREOF

(75) Inventor: Yung-Ting Lee, Taipei (TW)

(73) Assignee: Institute For Information Industry, Taipei (TW)

( * ) Notice: Subject to any disclaimer, the term of this patent is extended or adjusted under 35 U.S.C. 154(b) by 961 days.

(21) Appl. No.: 10/373,721

(22) Filed: Feb. 27, 2003

(65) Prior Publication Data

US 2004/0170149 A1 Sep. 2, 2004

(51) Int. Cl.
*H04Q 7/00* (2006.01)
*H04Q 7/20* (2006.01)

(52) U.S. Cl. ................... 370/329; 455/452.1
(58) Field of Classification Search ............... None
See application file for complete search history.

(56) References Cited

U.S. PATENT DOCUMENTS

| | | | | |
|---|---|---|---|---|
| 3,898,390 A | * | 8/1975 | Wells et al. ............ | 455/438 |
| 6,640,108 B2 | * | 10/2003 | Lu et al. .............. | 455/463 |
| 6,885,640 B2 | * | 4/2005 | Pinola ................. | 370/241 |
| 6,888,803 B1 | * | 5/2005 | Gentry et al. ........... | 370/259 |
| 7,072,340 B2 | * | 7/2006 | Agrawal et al. .......... | 370/392 |
| 7,123,923 B2 | * | 10/2006 | Thorson et al. .......... | 455/452.2 |
| 2001/0023459 A1 | * | 9/2001 | Asami ................ | 709/245 |

FOREIGN PATENT DOCUMENTS

WO     WO 99/52314     * 10/1999

* cited by examiner

*Primary Examiner*—Seema S. Rao
*Assistant Examiner*—Gregory B. Sefcheck
(74) *Attorney, Agent, or Firm*—Bacon & Thomas, PLLC

(57) ABSTRACT

System and method of simulating mobile communication by means of local area network are provided. After reset of simulation mobile station, the simulated mobile station is initialized for fetching a dynamic IP address from a simulated base station controller. It is determined whether there exists a simulated base station by receiving a broadcasting packet of the simulated base station. If yes, the simulated mobile station requests the simulated base station controller to obtain the dynamic IP address and establish a channel, and the simulated mobile station performs a certification procedure on the simulated base station. If the certification procedure is successful, the simulation mobile station enters into a link state for simulating mobile communication.

12 Claims, 4 Drawing Sheets

SYSTEM OF SIMULATING MOBILE COMMUNICATION AND METHOD THEREOF

BACKGROUND OF THE INVENTION

1. Field of the Invention

The present invention relates to the field of mobile communication and, more particularly, to a system and a method of simulating a mobile communication system.

2. Description of Related Art

Mobile communication has been known as a rapid, spectacular development in recent years. With reference to FIG. 1, there is illustrated a well-known network structure applicable for mobile communication. A cell 80 in the network for mobile communication comprises a base station 200 and two mobile stations (e.g., mobile phones, personal digital assistants (PDAs), or notebook computers) 210. It is also known that a number of advanced protocols for mobile communication such as General Packet Radio System (GPRS) and third generation (3G)/Wireless Code Division Multiple Access (WCDMA) have been developed recently due to the rapid progress of mobile communication technology. However, associated chipsets have not been developed or are difficult to obtain. Also, a corresponding network for mobile communication has not been established, resulting in an inhibition of complete peer-to-peer verification.

Some simulation programs for simulating mobile communication system have been proposed to solve the aforementioned problems and perform the protocol conformance test of a base station and a mobile station. However, these simulation programs are not able to perform a complete peer-to-peer verification between a base station and a mobile station, a simulation of handoff between the base station and the mobile station, and a simulation of multiple-to-multiple communication because the characteristics of physical layer have not been considered. Therefore, it is desirable to provide novel system and method of simulating mobile communication in order to mitigate and/or obviate the aforementioned problems.

SUMMARY OF THE INVENTION

The object of the present invention is to provide a system and a method of simulating a mobile communication system by means of a local area network.

With this object in view, the present invention provides a simulation method of a mobile communication system. The simulated mobile communication system has a first machine for simulating a base station controller, a second machine for simulating a base station, and multiple third machines, each simulating a mobile station associated with the corresponding base station. The first, second, and third machines are coupled together by a local area network (LAN). Each of the third machines has an upper adaptation layer, a control entity, a service entity, an event generator, a pseudo driver, a network translation program, and a database. The upper adaptation layer is interfaced with an upper layer mobile communication protocol. The control entity is commanded by the upper layer mobile communication protocol for setting communication channels and associated physical layer measurement. The service entity provides physical services to the upper layer mobile communication protocol. The event generator generates simulation events. The method comprises the steps of: (a) after resetting one of the simulated mobile stations, commanding the mobile station to enter into an initialization state for fetching a dynamic Internet Protocol (IP) address from the simulation base station controller; (b) after the simulated mobile station obtains the dynamic IP address, determining whether there exists a simulated base station by receiving a broadcasting packet of the simulated base station; (c) if the simulated base station exists, commanding the simulated mobile station to request the simulated base station controller to obtain a dynamic IP address controlled by the simulated base station and establish an associated channel; (d) commanding the simulated mobile station to perform a certification procedure on the simulated base station via the channel; and (e) if the certification procedure is successful, commanding the simulated mobile station to enter into a link state for simulating mobile communication.

The present invention provides a system of simulating mobile communication, which comprises a first machine for simulating a base station controller, at least a second machine for simulating a base station, and a plurality of third machines each for simulating a mobile station associated with the corresponding base station. The first, second, and third machines are coupled together by a local area network. Each of the third machines comprises an upper layer adaptation layer interfaced with a separate upper layer mobile communication protocol, a control entity commanded by the upper layer mobile communication protocol for setting communication channels and associated entity layer measurement via the upper layer adaptation layer, a service entity for providing physical services to the upper layer mobile communication protocol, an event generator for generating simulation events, a pseudo driver, a network translation, and a database. In response to resetting the simulated mobile station, the simulated mobile station enters into an initialization for fetching a dynamic Internet Protocol (IP) address from the simulated base station controller. In response to obtaining the dynamic IP address, the simulated mobile station determines whether there exists a simulated base station by receiving a broadcasting packet of the simulated base station, and if yes, the simulated mobile station request the simulated base station controller to obtain the dynamic IP address and establish an associated channel. The simulated mobile station performs a certification procedure on the simulated base station via the channel. If the certification procedure is successful, the simulated mobile station enters into a link state for simulating mobile communication.

Other objects, advantages, and novel features of the invention will become more apparent from the detailed description when taken in conjunction with the accompanying drawings.

DETAILED DESCRIPTION OF THE PREFERRED EMBODIMENT

Figure 1:
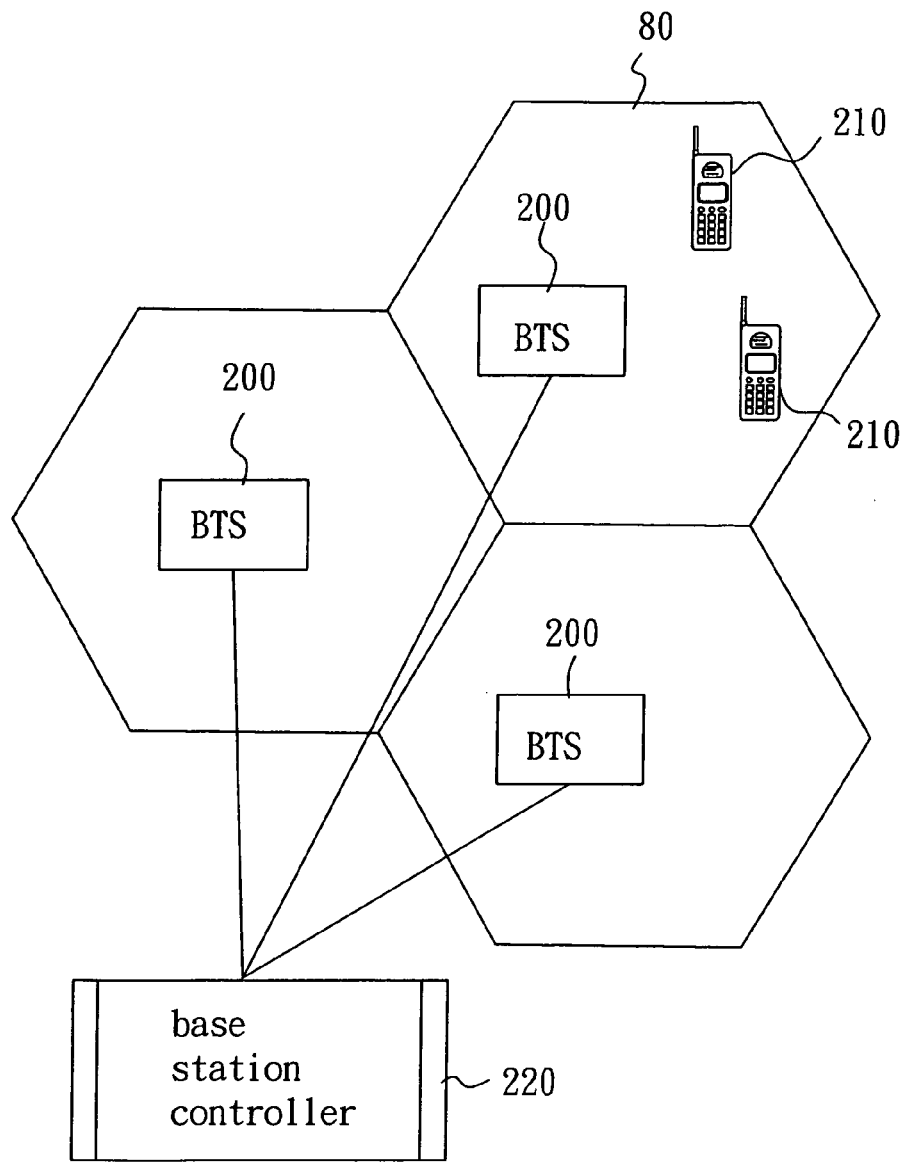
FIG. 1 shows a conventional network structure applicable for mobile communication.
Figure 2:
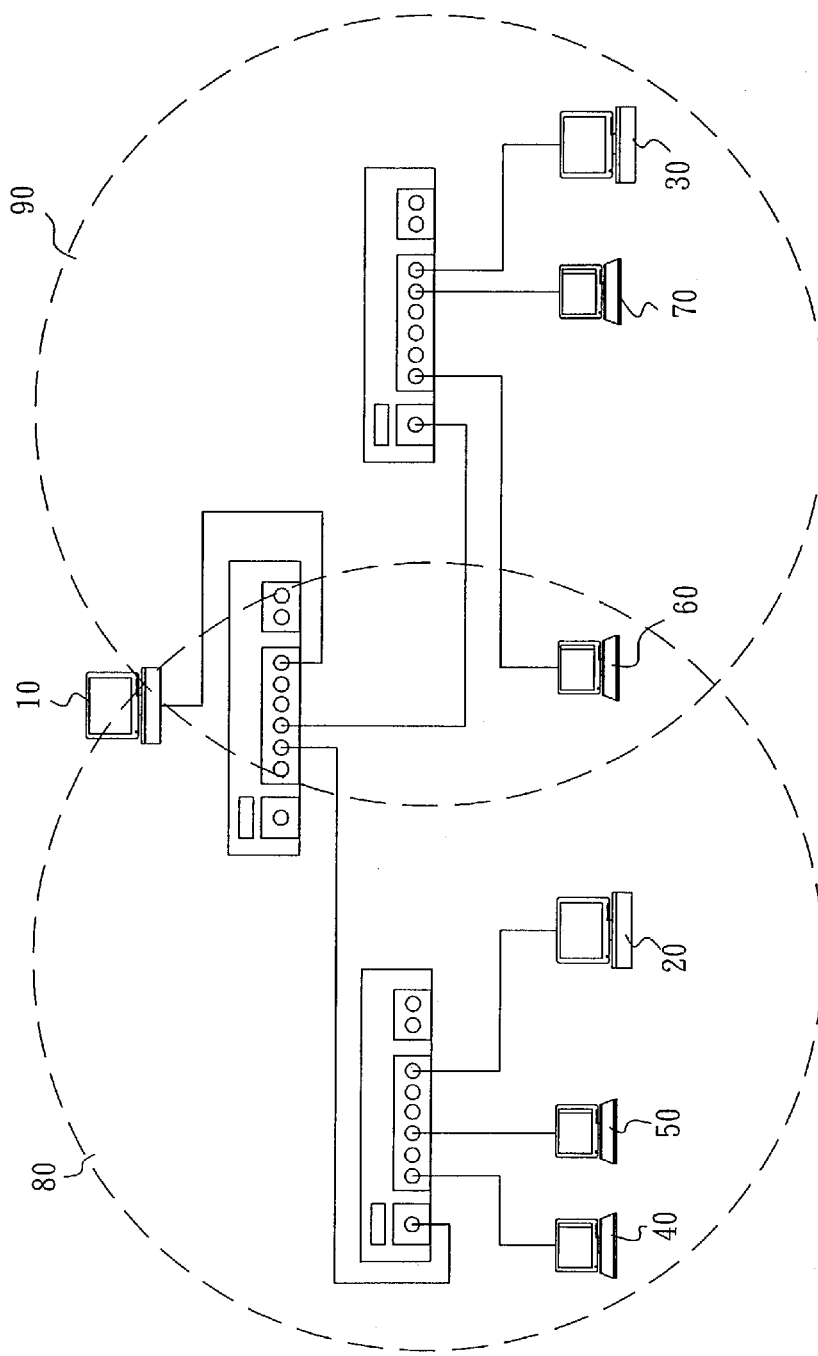
FIG. 2 schematically shows two cells incorporated in a system of simulating mobile communication according to the present invention.

With reference to FIG. 2, there is shown a system of simulating mobile communication in accordance with the present invention. The system comprises a first machine 10 for simulating a base station controller, two second machines 20, 30 for simulating base stations, and a plurality of third machines 40, 50, 60, and 70 for simulating mobile stations associated with the base stations. The first, second, and third machines are coupled together by a local area network (LAN). In this embodiment, the LAN is implemented as a well-known Ethernet. As shown, a cell 80 is comprised of the second machine 20 and third machines 40, 50, and another cell 90 is comprised of the second machine 30 and third machines 60, 70.

In the Ethernet, each of the first machine 10, second machines 20, 30, and third machines 40, 50, 60 and 70 has its own Internet Protocol (IP) address for simulating identification (ID) of mobile devices. IP address of each of the first machine 10 and second machines 20, 30 is fixed and IP addresses of each of the third machines 40, 50, 60 and 70 are dynamically assigned by the first machine 10. A plurality of different cells are formed in the Ethernet by a plurality of different sub-networks each corresponding to a base station. An association between a mobile station and a cell formed by base station is determined by a dynamically assigned IP address.

Figure 3:
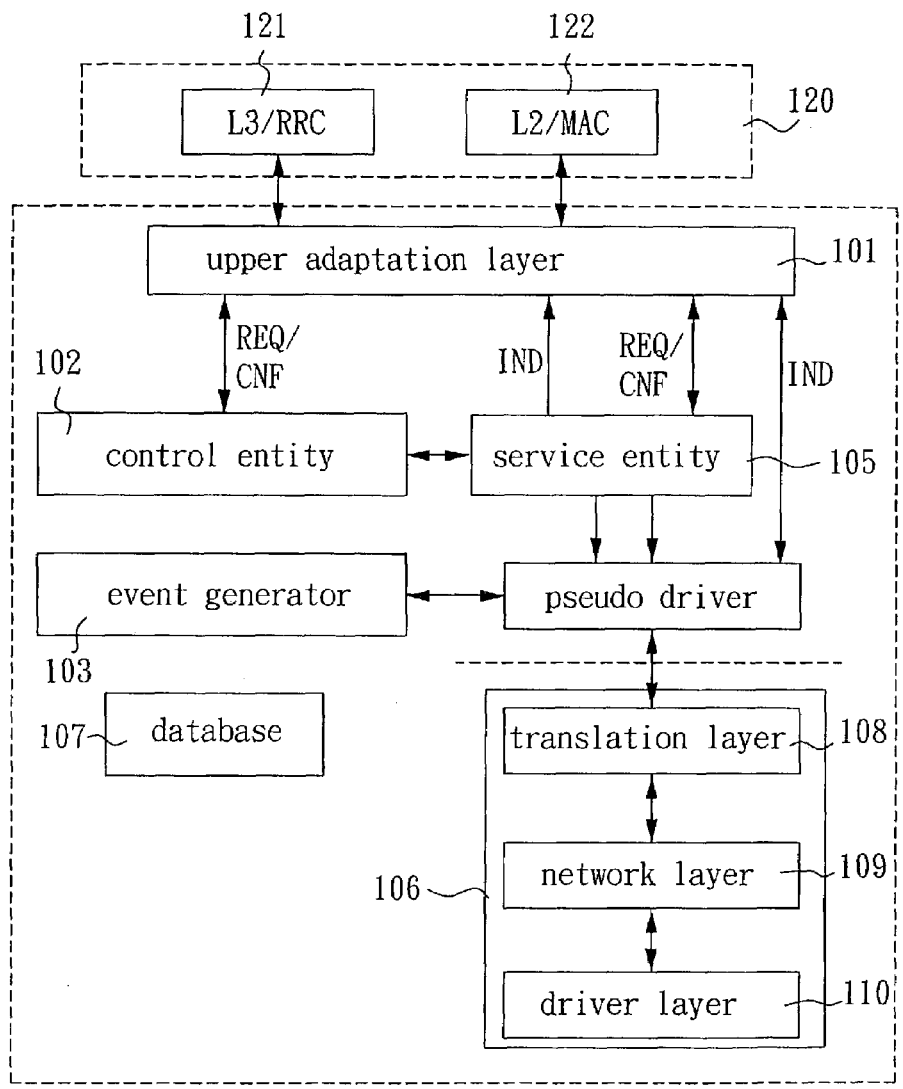
FIG. 3 is a block diagram schematically showing a software structure applicable for the system of FIG. 2.

With reference to FIG. 3, a mobile station simulated by any of the third machines 40, 50, 60, and 70 comprises an upper adaptation layer 101, a control entity 102, an event generator 103, a service entity 104, a pseudo driver 105, a network translation program 106, and a database 107. The upper adaptation layer 101 is interfaced with a separate upper layer mobile communication protocol 120. The interfaced upper layer mobile communication protocol 120 comprises a layer 3 (L3) or Radio Resource Control (RRC) 121 and a layer 2 (L2) or Media Access Control (MAC) 122. Both L3/RRC 121 and L2/MAC 122 are associated with Open System Interconnection (OSI) protocol.

The control entity 102 is commanded by the upper layer mobile communication protocol 120 for setting communication channels and associated physical layer measurement via the upper adaptation layer 101. The service entity 104 is served to provide services (e.g., channel quality measurement and mapping between transport channel and physical channel) to the upper layer mobile communication protocol 120. The event generator 103 is served to generate simulation events such as event for simulating signal fading or the like so that the upper layer mobile communication protocol 120 is capable of testing a handoff procedure or simulating propagation delay or propagation error.

The pseudo driver 105 is served to send the simulation events to the upper adaptation layer 101 or simulate mobile station driver such as automatic frequency control (AFC) or automatic gain control (AGC). The network translation 106 comprises a translation layer 108 interfaced with the pseudo driver 105 for providing Transport Control Protocol/User Datagram Protocol (TCP/UDP), a network layer 109 for providing a dynamic IP address assignment mechanism, and a driver layer 110 for providing a driver to the Ethernet.

Figure 4:
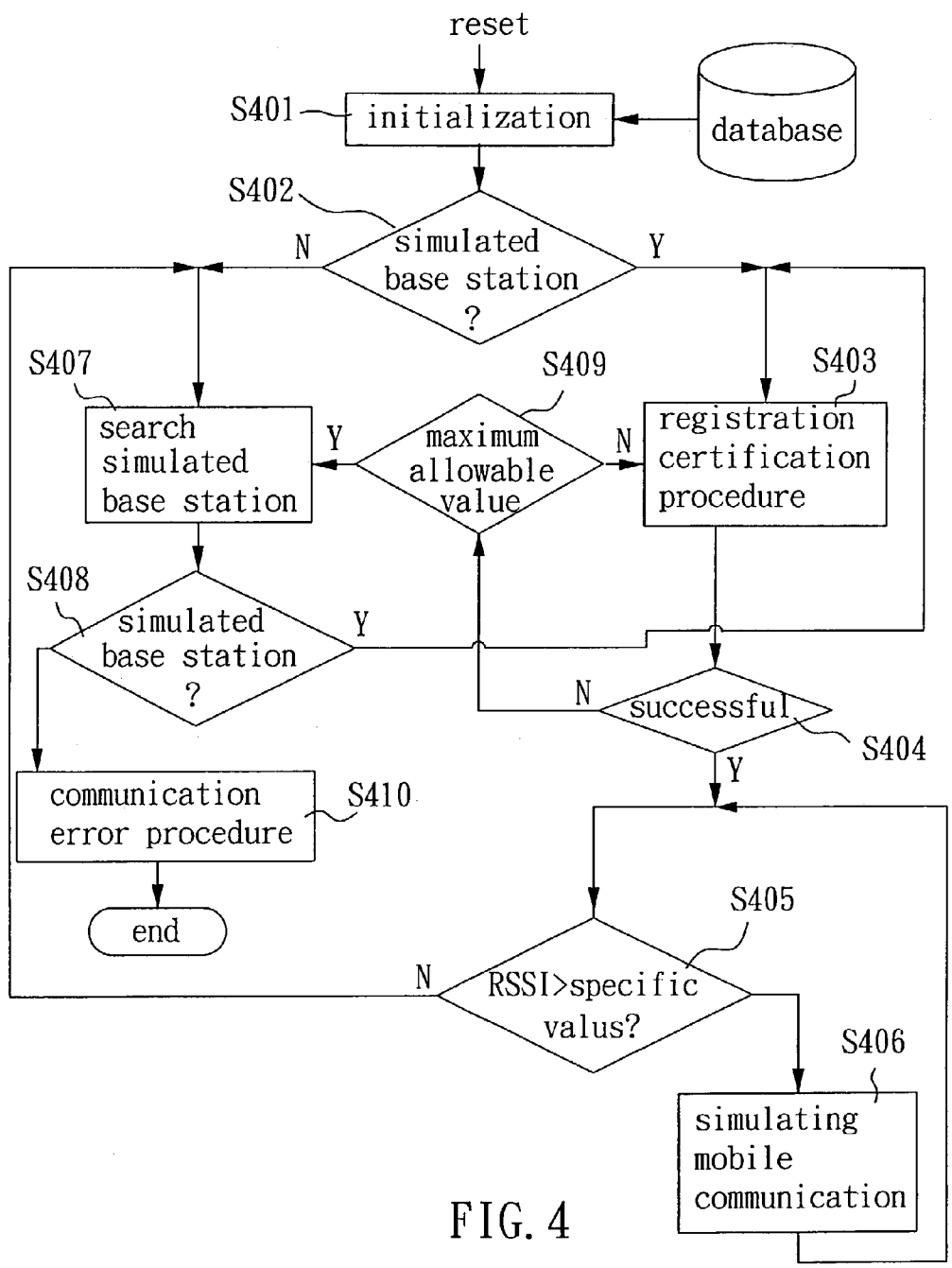
FIG. 4 is a flow chart illustrating a process of simulating mobile communication according to the present invention.

An enabled mobile station will retrieve information about base station (e.g., radio frequency (RF) and primary scrambling code of broadcasting channel of the base station before shutdown) from a Subscriber Identity Module (SIM) card at the cell where a previous shutdown was taken place. Such information is sent to a RF component via the L3/RRC 121 of the mobile station for registration at base station. With reference to FIG. 4, there is shown a flow chart illustrating a process of simulating mobile communication according to the invention. Steps of the process will now be described in detail below. In response to reset of a simulation mobile station, the simulation mobile station enters an initialization so as to fetch a dynamic IP address from the simulation base station controller (step S401).

An enabled mobile station will retrieve information about base station (e.g., RF and primary scrambling code of broadcasting channel of the base station before shutdown) from the database 107. Information is sent to the control entity 102 via L3/RRC 121 of the upper layer mobile communication protocol 120. In detail, in response to a receiving of request (REQ) of L3/RRC 121 via the upper adaptation layer 101, the control entity 102 sends a confirmation (CNF) signal back to L3/RRC 121 for acknowledgement and sends the request (REQ) to the service entity 104 for searching base station.

In response to a receiving of REQ from the control entity 102, the service entity 104 calls the associated pseudo driver 105 so as to read corresponding sub-network setting from the database 107. The pseudo driver 105 may set the network translation 106, including the translation layer 108, the network layer 109, and the driver layer 110 based on the sub-network setting for accessing the Ethernet and in turn for obtaining any assigned dynamic IP address from the simulation first machine 10 (i.e., the base station controller) over the Ethernet.

In response to the obtaining of dynamic IP address, the simulation mobile station determines whether there exists a simulation base station by receiving a broadcasting packet of the simulation base station (step S402). The simulation base station always broadcasts system information such as RF and primary scrambling code via a broadcasting channel. Thus, in response to the obtaining of dynamic IP address by the simulation mobile station, the broadcasting packet is received by the driver layer 110 and the network layer 109. The translation layer 108 then filters and obtains the system information by translation. The system information is in turn sent to the pseudo driver 105 which may send indication (IND) to the upper layer adaptation layer 101 for an appropriate protocol data unit (PDU) format translation prior to sending to the L2/MAC 122 of the upper layer protocol 120 for mobile communication. Finally, it is sent to the L3/RRC 121 of the upper layer mobile communication protocol 120 for determining whether there exists a corresponding simulation base station.

The process goes to step S403 if the determination in step S402 is positive. Otherwise, the process jumps to step S407. In step S403, the L3/RRC 121 of the upper layer mobile communication protocol 120 will issue a request REQ to the control entity 102 for setting other channels for registration. The control entity 102 then sends the REQ to the service entity 104. Also, the pseudo driver 105 sets the translation layer 108 for filtering out all packets not belonging to the selected simulation base station. At the same time, the network layer 109 requests the simulation base station controller 10 again to permit it to obtain a dynamic IP address in the sub-network of the simulation base station and establishes an associated channel (Ethernet port) for simulating a cell formed by the simulation base station. Then, the simulation mobile station may perform a registration certification procedure on the simulation base station via the channel.

In step S404, it is determined whether the registration certification procedure is successful. If yes, the process goes to step S405. Otherwise, the process jumps to step S409.

In step S405, the simulation mobile station enters into a link state for simulating mobile communication. The event generator 103 generates a received signal strength indicator (RSSI) based on a random procedure. The RSSI is in turn sent to the upper layer mobile communication protocol 120 by the pseudo driver 105. Furthermore, the upper layer mobile communication protocol 120 determines whether RSSI is larger than a predetermined value. If yes, the process goes to step S406. Otherwise, the process jumps to step S407. In step S406, a handoff is not required. Further, packet receiving and sending are performed for simulating mobile communication. The process then loops back to step S405.

The step S407 is performed when the determination in step S402 or S405 is negative. The upper layer mobile communication protocol 120 will issue a search command to the control entity 102 again for re-searching a simulation base station. Likewise, the control entity 102 will send a command to the service entity 104. In response to the receiving, the service entity 104 calls the pseudo driver 105 to re-set the translation layer 108 for receiving system information of different simulation base stations on the broadcasting channel to the pseudo driver 105. Hence, the upper layer mobile communication protocol 120 may determine whether there exists a simulation base station based on the system information.

In step S408, it is determined whether there exists a simulation base station. If yes, the process loops back to step S403. Otherwise, the process jumps to step S410.

In step S410, the simulation mobile station performs a communication error procedure for suspending the service entity 104, the event generator 103, the pseudo driver 105, and the network translation 106. Only the control entity 102 is able to receive physical layer (L1) system commands (e.g., reset and cell measurement) from the L3/RRC 121 of the upper layer mobile communication protocol 120. The process is thus terminated.

In step S404, if it determines that the registration certification procedure is fail, the process jumps to step S409. In step S409, it is determined whether the number of certification failure is larger than a maximum allowable value. If yes, the process loops back to step S407. Otherwise, the process loops back to step S403.

From the aforementioned description, the simulation technology for wireless communication of present invention can solve the problem in that associated chipsets have not been developed or are difficult to obtain. Also, it overcomes the problem in inhibiting a complete peer-to-peer verification due to that the corresponding infrastructure for mobile communication has not been established. Because the event generator 103 is provided for simulating the characteristic of the physical layer in present invention, it can perform a simulation of handoff between the base station and the mobile station, and further a simulation of multiple-to-multiple communication.

Although the present invention has been explained in relation to its preferred embodiment, it is to be understood that many other possible modifications and variations can be made without departing from the spirit and scope of the invention as hereinafter claimed.

What is claimed is:

1. A simulation method of a mobile communication system which has a first machine for simulating a base station controller, a second machine for simulating a base station, and multiple third machines, each simulating a mobile station associated with the corresponding base station, the first, second, and third machines being coupled together by a local area network (LAN), each of the third machines having an upper adaptation layer, a control entity, a service entity, an event generator, a pseudo driver, a network translation program, and a database, the upper adaptation layer being interfaced with an upper layer mobile communication protocol, the control entity being commanded by the upper layer mobile communication protocol for setting communication channels and associated physical layer measurement, the service entity providing services to the upper layer mobile communication protocol, the event generator generating simulation events, the method comprising:

(a) after resetting one of the simulated mobile stations, commanding the mobile station to enter into an initialization state for fetching a dynamic Internet Protocol (IP) address from the simulation base station controller;

(b) after the simulated mobile station obtains the dynamic IP address, determining whether there exists a simulated base station by receiving a broadcasting packet of the simulated base station;

(c) if the simulated base station exists, commanding the simulated mobile station to request the simulated base station controller to obtain a dynamic IP address controlled by the simulated base station and establish an associated channel;

(d) commanding the simulated mobile station to perform a certification procedure on the simulated base station via the channel; and (e) if the certification procedure is successful, commanding the simulated mobile station to enter into a link state for simulating mobile communication.

2. The method as claimed in claim 1, wherein the step (a) further comprises the sub-steps of:

(a1) enabling the simulated mobile station to retrieve information stored at the previous shutdown from the database and sending information to the control entity via the protocol for mobile communication;

(a2) commanding the control entity to send information to the service entity for searching base stations;

(a3) commanding the service entity to call the pseudo driver for reading a corresponding sub-network setting from the database; and (a4) commanding the pseudo driver to set the network translation based on the sub-network setting for accessing the LAN and obtaining the dynamic IP address assigned from the simulated base station controller over the LAN.

3. The method as claimed in claim 2, wherein information retrieved in the sub-step (a1) comprises radio frequency (RF) and primary scrambling code of a broadcasting channel of one of the base stations before shutdown.

4. The method as claimed in claim 1, wherein the step (b) further comprises the sub-steps of:

(b1) commanding the network translation to receive the broadcasting packet of the simulated base station over the LAN and sending the same to the pseudo driver;

(b2) commanding the pseudo driver to send information to the upper adaptation layer; and (b3) commanding the upper adaptation layer to send information to the protocol for mobile communication for determining whether there exists a simulated base station.

5. The method as claimed in claim 1, wherein in the step (c), the pseudo driver is used to set a translation layer of the network translation for filtering out all packets not belonging to the selected simulated base station.

6. The method as claimed in claim 1, wherein if the step (b) determines that the simulated base station is not existed, the following steps are performed:

(f) commanding the upper layer mobile communication protocol to issue a search command to the control entity again for searching a simulated base station;

(g) if the simulated base station exists, performing the step (c); and (h) if the simulated base station does not exist, performing a communication error procedure.

7. The method as claimed in claim 6, wherein in the step (h), the communication error procedure is performed to interrupt the service entity, the event generator, the pseudo driver, and the network translation with only the control entity being capable of receiving system commands from the upper layer mobile communication protocol.

8. The method as claimed in claim 1, wherein if the certification procedure in the step (d) fails, the following steps are performed:

(i) determining whether number of certification failure is larger than a maximum allowable value; and (j) if the number of certification failure is not larger than the maximum allowable value, performing the step (d), otherwise performing the step (f).

9. The method as claimed in claim 1, wherein the step (e) further comprises the sub-steps of:

(e1) generating a received signal strength indicator (RSSI) by the event generator based on a random number generation program and sending the RSSI to the upper layer mobile communication protocol by the pseudo driver;

(e2) determining whether the RSSI is larger than a predetermined value by the upper layer mobile communication protocol; and (e3) if the RSSI is larger than the predetermined value, performing the step (e), otherwise performing the step (f).

10. A system of simulating mobile communication comprising:

a first machine for simulating a base station controller;

at least a second machine for simulating a base station; and a plurality of third machines each for simulating a mobile station associated with the corresponding base station, wherein the first, second, and third machines are coupled together by a local area network; each of the third machines comprises an upper layer adaptation layer interfaced with a separate upper layer mobile communication protocol, a control entity commanded by the upper layer mobile communication protocol for setting communication channels and associated entity layer measurement via the upper layer adaptation layer, a service entity for providing services to the upper layer mobile communication protocol, an event generator for generating simulation events, a pseudo driver, a network translation, and a database; and wherein in response to resetting the simulated mobile station, the simulated mobile station enters into an initialization for fetching a dynamic Internet Protocol (IP) address from the simulated base station controller; in response to obtaining the dynamic IP address, the simulated mobile station determines whether there exists a simulated base station by receiving a broadcasting packet of the simulated base station, and if yes, the simulated mobile station request the simulated base station controller to obtain the dynamic IP address and establish an associated channel; the simulated mobile station performs a certification procedure on the simulated base station via the channel; if the certification procedure is successful, the simulated mobile station enters into a link state for simulating mobile communication.

11. The system as claimed in claim 10, wherein the LAN is an Ethernet.

12. The system as claimed in claim 11, wherein the network translation comprises a translation layer interfaced with the pseudo driver for providing a Transport Control Protocol/User Datagram Protocol (TCP/UDP), a network layer for providing a dynamic IP address assignment mechanism, and a driver layer for providing a driver to the Ethernet.

* * * * *